UNITED STATES PATENT OFFICE 2,655,787

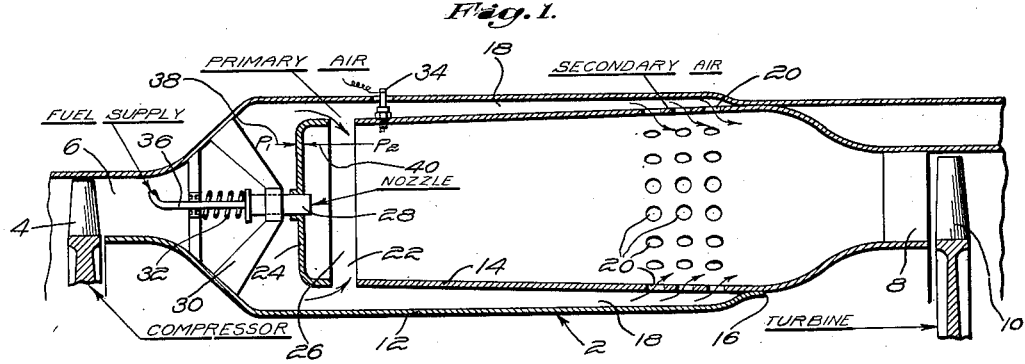

GAS TURBINE COMBUSTION CHAMBER WITH VARIABLE AREA PRIMARY AIR INLET

Edmund D. Brown, Manchester, Conn., assignor to United Aircraft Corporation, East Hartford, Conn., a corporation of Delaware Application November 21, 1949, Serial No. 128,657

7 Claims. (Cl. 60—39.23)

This invention relates to combustion chamber construction and particularly to a combustion chamber for use in a gas turbine power plant of the type adapted for aircraft use.

The compressors normally used in the gas turbine type of power plant produce an excess of air over that required for combustion and it has been found difficult particularly at low fuel flows to maintain a mixture of fuel and air within the combustion chamber which will support continuous combustion. When the ratio of air to fuel becomes too high the flame will not burn continuously and will blow out or will cause rough and imperfect combustion. A feature of this invention is an arrangement by which to assure a substantially constant fuel-air ratio within the part of the combustion chamber where combustion takes place.

Another feature of the invention is an adjustment of the air supply to the combustion chamber as a function of the fuel flow so that the quantity of air admitted to the part of the flame tube in which the combustion takes place will be varied directly as the fuel flow is varied. One feature of the invention is the adjustment of the air inlet to part of the combustion chamber in which combustion takes place as a function of the pressure within this part of the combustion chamber and the pressure outside of and upstream of this part of the combustion chamber. Another feature is the adjustment of the airflow area into the part of the combustion chamber where combustion takes place as a function both of the fuel flow and of the differenial in air pressures outside of and within the flame tube.

Other objects and advantages will be apparent from the specification and claims, and from the accompanying drawing which illustrates an embodiment of the invention.

Fig. 1 is a sectional view through the combustion chamber.

Fig. 2 is a sectional view similar to Fig. 1 showing a modification.

Fig. 3 is a fragmentary side elevation of the adjusting means of Fig. 2.

Fig. 4 is a sectional view similar to Fig. 1 showing another modification.

The invention is shown in a combustion chamber 2 for a gas turbine power plant in which the compressor rotor 4 supplies air to the combustion chamber inlet 6 and the hot gas resulting from combustion within the chamber discharges through nozzles 8 at the downstream end of the chamber onto a turbine rotor 10. The compressor and turbine rotors are connected together so that the turbine drives the compressor.

The combustion chamber is made up of an outer shell 12 and a flame tube 14 located within and spaced from the shell 12. Adjacent the downstream end the shell 12 and tube 14 reach approximately the same diameters, as at 16, to close the annular space 18 around the flame tube. Adjacent the point 16 the flame tube is provided with openings 20 through which secondary air from the space 18 flows into the flame tube and is there mixed with the products of the combustion within the flame tube.

The upstream or inlet end 22 of the flame tube is spaced from the combustion chamber inlet 6 for the admission of primary air and a cap 24, upstream of the inlet end of the flame tube, is spaced therefrom so that the air inlet is in the form of an annular opening 26 between the cap and the flame tube. The cap is mounted for axial movement for varying the area of the air inlet 26 and in the arrangement shown in Fig. 1 this is accomplished by mounting the cap on the fuel inlet nozzle 28 and supporting the latter as by a spider 30. The nozzle is resiliently held in the central position shown for maintaining a constant inlet area by a spring 32. This spring resiliently resists the reactive force of fuel as it is discharged in a downstream direction from the nozzle tip. The mixture of fuel and air within the upstream end of the flame tube is ignited as by a spark plug 34 and combustion preferably takes place in the flame tube between its inlet end and the point where the secondary air enters through the openings 20. The spring also resists movement of cap 24 in response to changes in the pressure differential acting on the cap.

With the cap 24 supported resiliently by the spring 32, an increase in the fuel flow through the supply pipe 36 will increase the reaction on the nozzle 28, tending to move the nozzle and the cap 24 to the left. This increases the inlet area for the primary air thereby increasing the quantity of air in proportion to the increase in fuel.

The cap 24 is also acted upon by the pressure upstream of the cap represented by the arrow 38 and by the pressure on the downstream side of the cap represented by the arrow 40. When mass airflow increases, the pressure differential ($P_1$, upstream of the cap 24, minus $P_2$, downstream of the cap) increases. This increase will tend to move the cap to the right, thereby decreasing the air inlet area, for maintaining the fuel-air ratio constant in spite of variations in the airflow. The decrease in the air inlet area decreases the flow through the opening 26 to control the fuel-air ratio in the part of the flame tube where combustion takes place and incidentally increases the flow through the openings 20 by the increase in the pressure drop across these latter openings.

In the arrangement of the combustion chamber and flame tube in Figs. 2 and 3, the inlet end 42 of the flame tube 44 receives a cup or cap 46 which replaces cap 24 and is slidable within the flame tube. The outer side wall of the cup has slots 48 and by axial movement of the cup these slots are opened more or less for the inflow of air to the flame tube. The cup 46 is axially slidable on the fuel nozzle 50 and is held in the central position shown by a spring 52. This cup is movable in response to variations in the pressures outside of the cup and within the flame tube, comparable to the pressures $P_1$ and $P_2$ of Fig. 1.

Associated with the cup 46 is another smaller cup or cap 54 fitting within cup 46 and having slots 56 in its side wall in radial alignment with the slots 48. The cup 54 is fixed to the fuel nozzle for axial movement therewith and the nozzle itself is resiliently supported by a coil spring 58 which in the arrangement shown is the fuel inlet tube. The spring 58 engages a strut 60 at the inlet end of the combustion chamber. Thus the inner cup 54 is moved axially in response to variations in the fuel flow, an increase in the fuel flow moving the cup 54 to the left for increasing the air inlet area to the flame tube.

It will be noted that the end wall of the inner cup 54 has a number of small openings 62 for transmitting the pressure within the flame tube to the inner wall of the outer cup 46 so that the pressure within the flame tube may react directly on the outer cup.

As a further modification, the combustion chamber 64 of Fig. 4 has a flame tube 66 similar to the flame tube 14 and an end cap 68 which replaces the cap 24 and which is in the form of a ring guided by a fixed supporting ring 70 within the combustion chamber. The ring 70 may be supported by carrying members 72 to retain its position in alignment with the flame tube. Cap 68 is spaced from the inner end of the flame tube to define an air inlet passage 74 the area of which may be varied by the action of tension spring 76 which urges the cap to the left. The pressures outside of the flame tube and within the flame tube, comparable to $P_1$ and $P_2$ of Fig. 1, act on the cap 68 for adjusting the air inlet area as a function of the pressure differential.

In this same figure the fuel nozzle 78 is urged to the right by a spring 80 and carries a disk 82 engaging with an inwardly extending flange 84 on the ring 70 for more or less closing an air inlet passage 86 between the disk and the flange. The area of passage 86 is varied as a function of the fuel flow since the reaction on the nozzle as the flow of fuel is increased for example will move the nozzle to the left and increase the area of passage 86.

It is to be understood that the invention is not limited to the specific embodiment herein illustrated and described, but may be used in other ways without departure from its spirit as defined by the following claims.

I claim:

1. In a combustion chamber, a flame tube in which combustion takes place, a duct surrounding said tube and into which air is introduced, means for discharging fuel into the flame tube, a constant dimension passage through which air from the duct continuously enters the tube, and a movable end cap at the upstream end of the flame tube defining between said cap and tube a variable opening through which air in said duct continuously enters the tube, said end cap being substantially the same diameter as said flame tube and movable in response to a difference in the pressures acting on opposite sides of the cap for adjusting the size of the opening.

2. In a combustion chamber, a flame tube in which combustion takes place, a duct surrounding said tube and into which air is introduced, means for discharging fuel into the flame tube, and a movable end cap at the upstream end of the flame tube defining between said cap and tube an opening through which air in said duct enters the tube, and a fuel nozzle carried by said cap and discharging fuel into said tube in a direction substantially parallel to the motion of the cap to impart a thrust thereto, said end cap being movable in response to pressure changes on opposite sides of the cap for adjusting the size of the opening.

3. In a combustion chamber, a flame tube in which combustion takes place, a duct surrounding said tube and into which air is introduced, means for discharging fuel into the flame tube, and a movable end cap at the upstream end of the flame tube defining between said cap and tube an opening through which air in said duct enters the tube, and a fuel nozzle carried by said cap and discharging fuel into said tube in a direction substantially parallel to the motion of the cap to impart a thrust thereto, said end cap being movable in response to pressure changes on opposite sides of the cap for adjusting the size of the opening, the thrust exerted by the fuel discharge functioning further to control the area of the opening.

4. In a combustion chamber, a flame tube in which combustion takes place, a duct surrounding said tube and into which air is introduced, means for discharging fuel into the flame tube, and a movable end cap at the upstream end of the flame tube defining between said cap and tube an opening through which air in said duct enters the tube, a fuel nozzle carried by said cap and discharging fuel into said tube in a direction substantially parallel to the motion of the cap, a fuel supply tube to said nozzle, said supply tube being resilient to act as a spring on said cap, said end cap being movable in response to pressure changes on opposite sides of the cap and in response to the thrust exerted by the discharge of fuel from the nozzle for adjusting the size of the opening.

5. In a combustion chamber, a flame tube in which combustion takes place, a duct surrounding said tube and into which air is introduced, means for discharging fuel into the flame tube, air passages for the admission of air from the duct into the tube, certain of said passages being variable in size, means responsive to the pressure differential between the tube and the duct for varying certain of said passages, and means responsive to variations of fuel flow to said tube for varying the size of certain of said passages.

6. A combustion chamber construction including a duct, a flame tube within the duct, and movable closure means at the upstream end of the tube for varying the flow area for air from the duct into the tube in combination with means responsive to fuel flow for adjusting said closure means, and means responsive to the pressure differential between the duct and the tube for adjusting said closure means.

7. A combustion chamber construction including a duct, a flame tube within the duct, a closure at the upstream end of the tube for defining with said tube, a variable area passage for air from the duct to the tube, said closure being exposed at one side to the pressure within the duct and at the other side to the pressure within the tube, and a spring acting on said closure whereby the closure is movable in response to pressure changes within the tube and duct for varying the area of the passage, and another movable closure at the upstream end of the tube and defining another variable area passage for air into the tube, a fuel nozzle carried by said another movable closure discharging fuel in a direction to cause movement of said another closure in response to the reactive force upon the nozzle.

EDMUND D. BROWN.

References Cited in the file of this patent

UNITED STATES PATENTS

| Number | Name | Date |
|---|---|---|
| 660,429 | Hanford | Oct. 23, 1900 |
| 1,052,588 | Janicki | Feb. 11, 1913 |
| 2,227,666 | Noack | Jan. 7, 1941 |
| 2,445,466 | Arnhym | July 20, 1948 |
| 2,602,291 | Farnell | July 8, 1952 |

FOREIGN PATENTS

| Number | Country | Date |
|---|---|---|
| 452,900 | Germany | Nov. 22, 1927 |
| 539,069 | Great Britain | Aug. 27, 1941 |